United States Patent
Yamamoto

(10) Patent No.: US 11,429,054 B2
(45) Date of Patent: Aug. 30, 2022

(54) IMAGE FORMING APPARATUS WITH IMPROVED DESIGN TO PREVENT ERRONEOUS DETECTION AND METHOD FOR PREVENTING ERRONEOUS DETECTION OF ABNORMALITY IN IMAGE FORMING APPARATUS

(71) Applicant: Yuusuke Yamamoto, Kanagawa (JP)

(72) Inventor: Yuusuke Yamamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 34 days.

(21) Appl. No.: 17/003,015

(22) Filed: Aug. 26, 2020

(65) Prior Publication Data

US 2021/0132538 A1 May 6, 2021

(30) Foreign Application Priority Data

Oct. 31, 2019 (JP) .............................. JP2019-198955

(51) Int. Cl.
  *G03G 15/00* (2006.01)
  *H02H 9/02* (2006.01)

(52) U.S. Cl.
  CPC ............. *G03G 15/80* (2013.01); *G03G 15/55* (2013.01); *H02H 9/02* (2013.01)

(58) Field of Classification Search
  USPC .......................................................... 399/37
  See application file for complete search history.

(56) References Cited

U.S. PATENT DOCUMENTS

| 4,890,128 A  * | 12/1989 | Kania ................... F41B 5/1492 |
| | | 396/426 |
| 5,673,187 A | 9/1997 | Tokunaga et al. |
| 2014/0079422 A1* | 3/2014 | Suzuki ............... G03G 15/1675 |
| | | 399/66 |
| 2015/0035557 A1* | 2/2015 | Kozaki .............. G03G 15/1605 |
| | | 399/66 |
| 2015/0177665 A1* | 6/2015 | Saito .................... G03G 15/553 |
| | | 399/25 |
| 2016/0282746 A1* | 9/2016 | Yaguchi ............... G03G 15/043 |

FOREIGN PATENT DOCUMENTS

| JP | 8-179660 | 7/1996 |
| JP | 2008-225029 | 9/2008 |
| JP | 2013-195470 | 9/2013 |

* cited by examiner

*Primary Examiner* — Quana Grainger
(74) *Attorney, Agent, or Firm* — IPUSA, PLLC

(57) ABSTRACT

An image forming apparatus includes an image bearer; a first power supply configured to generate a first voltage applied to the image bearer according to a first voltage control signal; a second power supply configured to generate a second voltage, which has a polarity opposite to a polarity of the first voltage, applied to the image bearer according to a second voltage control signal; and circuitry. The circuitry is configured to generate the first voltage control signal and the second voltage control signal, detect an overcurrent in the image forming apparatus as an abnormality; and set a mask period for masking detection of the abnormality in response to an input of the second voltage control signal after an input of the first voltage control signal.

8 Claims, 13 Drawing Sheets

IMAGE FORMING APPARATUS WITH IMPROVED DESIGN TO PREVENT ERRONEOUS DETECTION AND METHOD FOR PREVENTING ERRONEOUS DETECTION OF ABNORMALITY IN IMAGE FORMING APPARATUS

CROSS-REFERENCE TO RELATED APPLICATION

This patent application is based on and claims priority pursuant to 35 U.S.C. § 119(a) to Japanese Patent Application No. 2019-198955, filed on Oct. 31, 2019, in the Japan Patent Office, the entire disclosure of which is hereby incorporated by reference herein.

BACKGROUND

Technical Field

The present disclosure relates to an image forming apparatus, and a method for preventing erroneous abnormality detection in the image forming apparatus.

Related Art

There is a technology for stopping output of a power supply in an image forming apparatus upon an occurrence of an abnormality such as a short circuit in a load. The power supply mentioned here is, for example, a power supply that applies a bias having a polarity opposite to that of toner to a load such as a charging member, a transfer member, or an image bearer; or a power supply that applies a bias having the same polarity as the toner to the load.

SUMMARY

According to an embodiment of this disclosure, an image forming apparatus includes an image bearer; a first power supply configured to generate a first voltage applied to the image bearer according to a first voltage control signal; a second power supply configured to generate a second voltage, which has a polarity opposite to a polarity of the first voltage, applied to the image bearer according to a second voltage control signal; and circuitry. The circuitry is configured to generate the first voltage control signal and the second voltage control signal, detect an overcurrent in the image forming apparatus as an abnormality; and set a mask period for masking detection of the abnormality in response to an input of the second voltage control signal after an input of the first voltage control signal.

Another embodiment of this disclosure provides a method far-preventing erroneous abnormality detection in an image forming apparatus. The method includes detecting an input of a first voltage control signal instructing generation of a first voltage applied to an image bearer; detecting an input of a second voltage control signal instructing generation of a second voltage applied to the image bearer, the second voltage having a polarity opposite to a polarity of the first voltage; detecting an overcurrent in the image forming apparatus as an abnormality; and setting a mask period for masking detection of the abnormality in response to the input of the second voltage control signal after the input of the first voltage control signal.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
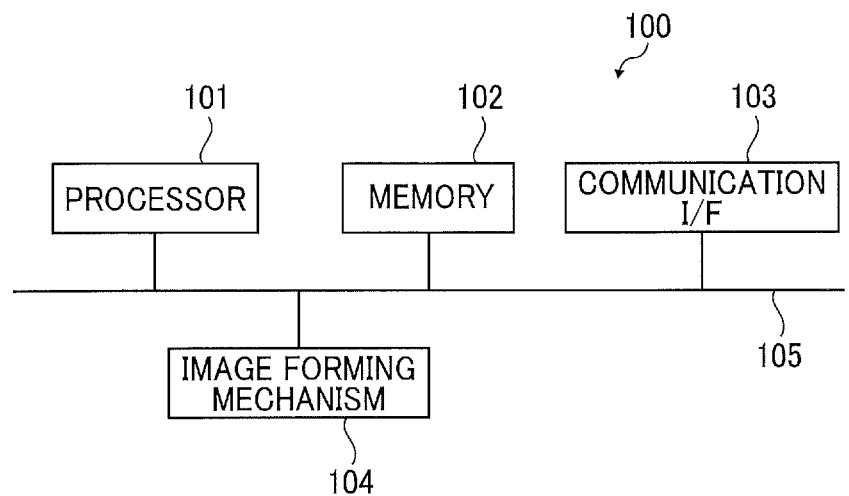
FIG. 1 is a block diagram illustrating a hardware configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Referring now to the drawings, wherein like reference numerals designate identical or corresponding parts throughout the several views thereof, embodiments of this disclosure are described. As used herein, the singular forms "a," "an," and "the" are intended to include the plural forms as well, unless the context clearly indicates otherwise.

Below, embodiments of the present disclosure are described with reference to accompanying drawings. FIG. 1 is a block diagram illustrating a hardware configuration of an image forming apparatus according to an embodiment of the present disclosure. An image forming apparatus 100 includes a processor 101, a memory 102, a communication interface (I/F) 103, and an image fruiting mechanism 104. The processor 101 is a computing unit that includes a microcomputer, a graphics processing unit (GPU), and a system large scale integration (LSI). The memory 102 is a storage unit that includes a random access memory (RAM) and a read only memory (ROM). The communication I/F 103 is, for example, an interface for connecting the image forming apparatus 100 to a network, and the processor 101 can exchange data, control information, and the like with an external device (for example, a cloud server) via a bus 105.

Figure 2:
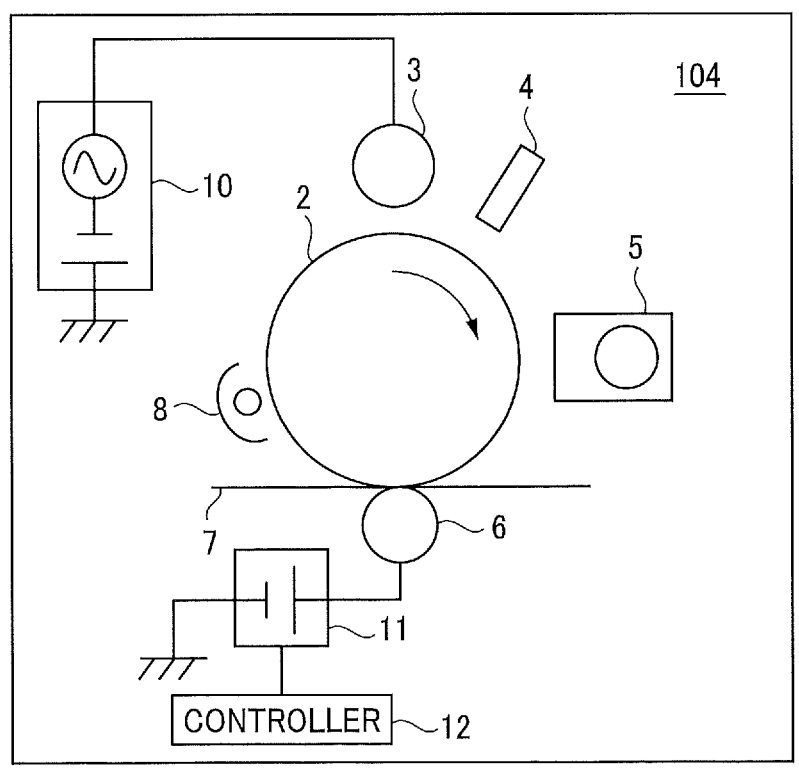
FIG. 2 is a diagram illustrating an example of a configuration of an image forming mechanism of the image forming apparatus illustrated in FIG. 1.

Next, aa description is given of an example of a configuration of the image forming mechanism 104 with reference to FIG. 2. FIG. 2 is a schematic view illustrating a configuration of the image forming mechanism. The image forming mechanism 104 has a function of forming an image on a recording medium.

The image forming mechanism 104 includes a photoconductor 2 (an image bearer), a charging roller 3, an exposure device 4, a developing device 5, a transfer roller 6, an intermediate transfer belt 7, and a discharger 8. The image forming mechanism 104 further includes a power supply 10, which is a high-voltage power supply to generate a charging bias, a power supply 11, which is a high-voltage power supply to generate a transfer bias, and a controller 12.

In the image forming mechanism 104, the power supply 10 generates and applies the charging bias to the charging roller 3, to uniformly charge the photoconductor 2. Thereafter, the exposure device 4 exposes the photoconductor 2 according to an image signal to form an electrostatic latent image on the photoconductor 2. After the developing device 5 develops the latent image into a toner image, the power supply 11 applies the transfer bias to the transfer roller 6, to transfer the toner image from the photoconductor 2 onto the intermediate transfer belt 7. Then, a secondary transfer device transfers the toner image from the intermediate transfer belt 7 onto a recording medium, and a fixing device fixes the toner image. Thus, an image is obtained. After the discharger 8 removes the electric charge on the surface of the photoconductor 2, the charging process is performed. In the case of color printing, there are four similar mechanisms to form and transfer respective color toner images onto the intermediate transfer belt, and then the toner images are conveyed to the secondary transfer device and the fixing device.

Figure 3:
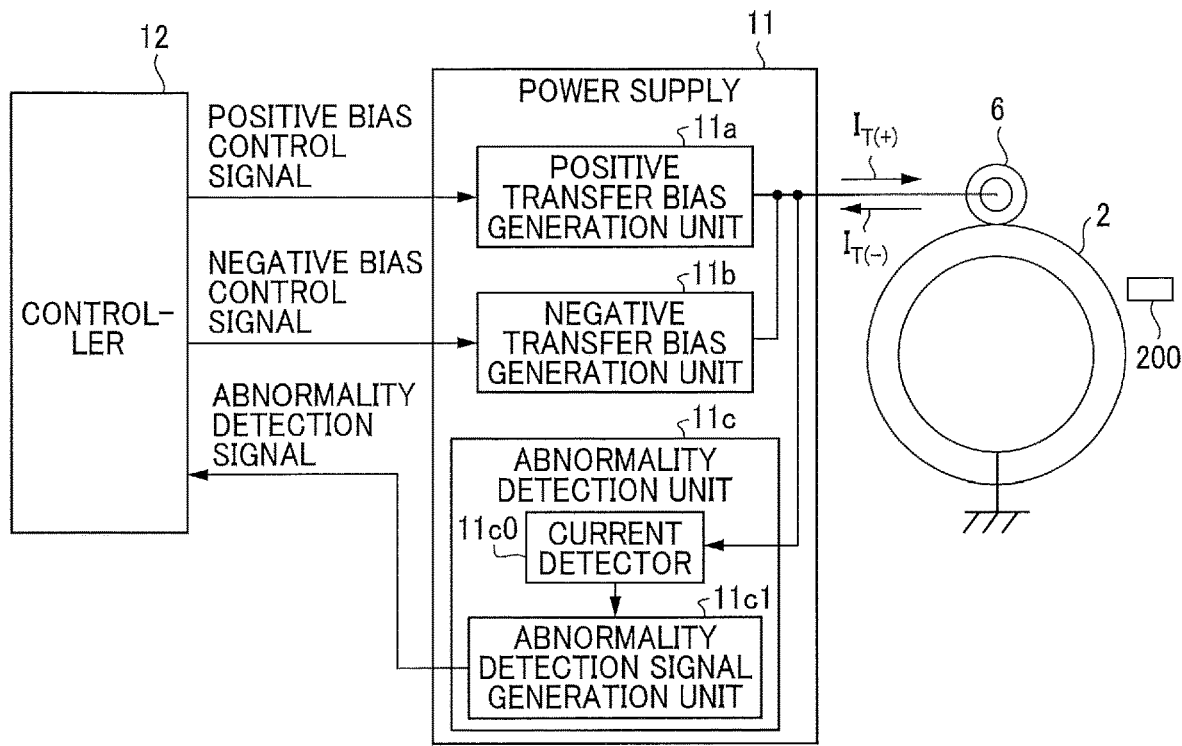
FIG. 3 is a diagram illustrating an example of a configuration of a power supply that generates a transfer bias in the image forming apparatus.

Next, a description is given of an example of a configuration of the power supply 11 with reference to FIG. 3. FIG. 3 is a diagram illustrating an example of a configuration of the power supply that generates the transfer bias. The power supply 11 includes a positive transfer bias generation unit 11a, a negative transfer bias generation unit 11b, and an abnormality detection unit 11c. The positive transfer bias generation unit 11a generates a transfer bias having a positive polarity (positive transfer bias), applied to the photoconductor 2. The negative transfer bias generation unit 11b generates a transfer bias having a negative polarity (negative transfer bias), applied to the photoconductor 2. A potential sensor 200 is provided near the photoconductor 2.

The positive transfer bias generation unit 11a is a first power supply that applies a positive transfer bias to the photoconductor 2. The positive transfer bias is a first voltage having a positive polarity and controlled in constant-voltage control. The negative transfer bias generation unit 11b is a second power supply that applies a negative transfer bias to the photoconductor 2. The negative transfer bias is a second voltage having a polarity opposite to that of the first voltage and controlled in constant-voltage control.

The magnitudes and timings of the positive transfer bias and the negative transfer bias are determined by a control signal that is a pulse-width modulation (PWM) signal output from the controller 12.

The controller 12 can individually control the positive transfer bias and the negative transfer bias with two types of control signals (a positive bias control signal and negative bias control signal). When the positive transfer bias generation unit 11a outputs the positive transfer bias, a transfer current $I_{T(+)}$ that is an electrical current having a positive polarity, for image transfer, flows. When the negative transfer bias generation unit 11b outputs the negative transfer bias, a transfer current $I_{T(-)}$ that is an electrical current, having a negative polarity, for image transfer flows. The transfer current $I_{T(+)}$ and the transfer current $I_{T(-)}$ are also referred to as output currents in the description below.

In a case where the surface potential of the photoconductor 2 as an image bearer has a polarity opposite to that of the constant-voltage controlled output from the high-voltage power supply, in response to a detection that the output current exceeds a threshold (threshold current value), the abnormality detection unit 11c determines that an occurrence of short circuit in a load (hereinafter "load short circuit") and transmits an abnormality detection signal to the controller 12. The output current is detected by, for example, a current detector 11c0 in FIG. 3. A detailed description of the abnormality detection unit 11c is deferred.

The controller 12 controls the power supply 11 and outputs two types of control signals to the power supply 11. For example, when a foreign substance is caught in the image forming mechanism 104 or when an overcurrent occurs due to a ground fault, the output current of the power supply 11 exceeds a threshold current value. At that time, in response to reception of an abnormality detection signal from the abnormality detection unit 11c, the controller 12 executes short-circuit detection control processing or overcurrent detection control processing (hereinafter "short-circuit detection control"). The short-circuit detection control includes, for example, stopping the operation of the power supply 11 or the like at the occurrence of an overcurrent during constant voltage control and notifying the user of an abnormal state.

However, even during normal use, that is, even when no foreign substance is trapped in the image forming mechanism 104 and no ground fault occurs, in some cases, the output current from the power supply 11 exceeds the threshold current value due to the environment (temperature and humidity) surrounding the image forming apparatus 100, initial variations of the load, variations of the load over time, and the like. For example, when the temperature around the image forming mechanism 104 rises, the amount of moisture retained on the transfer roller 6 relatively increases, so that the impedance from the transfer roller 6 to the ground of the photoconductor 2 decreases. Therefore, even when a constant voltage is applied, the current flowing to the photoconductor 2, that is, the output current from the power supply 11 may exceed the threshold current value.

In view of such a problem, according to the present embodiment, the image forming apparatus 100 provides a mask period of abnormality detection processing in a predetermined case so that an increase in the output current from the power supply 11 does not result in erroneous detection of abnormality such as short-circuit.

The abnormality detection processing includes detecting an abnormality by detection of an overcurrent due to, for example, a load short circuit, and generating and outputting an abnormality detection signal indicating that the abnormality has been detected to the controller 12. Hereinafter, the abnormality detection processing is simply referred to as abnormality detection.

The mask period of the abnormality detection is a period for masking the period in which the abnormality detection signal is output. Specifically, in the mask period of the abnormality detection, the abnormality detection is suspended, and the term "suspending" is to invalidate or stop the output of the abnormality detection signal.

Although the power supply 11 includes the abnormality detection unit 11c in the present embodiment, alternatively, the controller 12 can include the abnormality detection unit 11c. Further, although provided in one power supply 11 in the present embodiment, the positive transfer bias generation unit 11a and the negative transfer bias generation unit 11b can be separate power supplies. The components of each of the positive transfer bias generation unit 11a and the negative transfer bias generation unit 11b can be mounted on either one substrate or different substrates.

Figure 4:
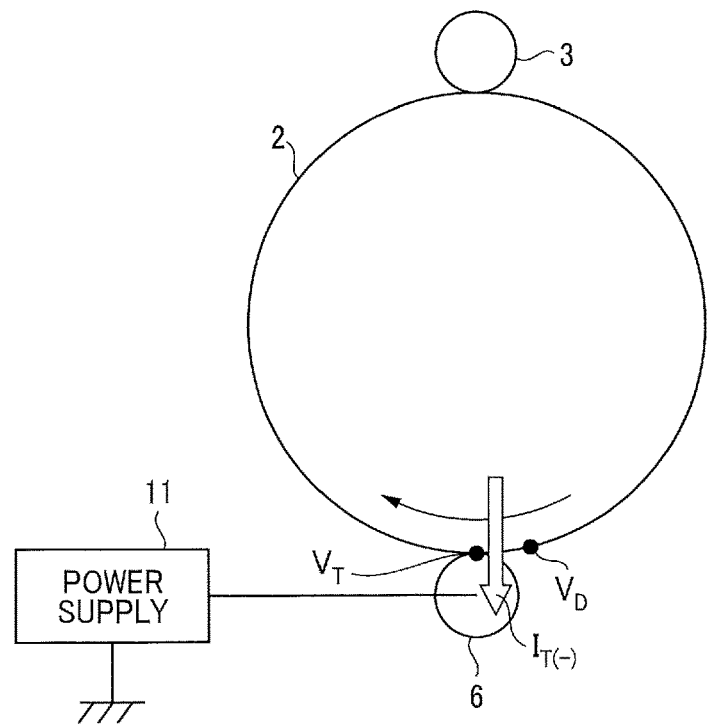
FIG. 4 is a diagram illustrating a relationship among a transfer current, a transfer voltage, and a photoconductor surface potential.

Next, a description is given of a relationship among the transfer current, the transfer voltage, and the photoconductor surface potential with reference to FIGS. 4 to 7. FIG. 4 is a diagram illustrating the relationship among the transfer current, the transfer voltage, and the photoconductor surface potential. FIG. 4 illustrates the charging roller 3, the photoconductor 2, the transfer roller 6, the transfer current $I_{T(-)}$ output from the power supply 11, a photoconductor surface potential $V_D$ near the transfer roller nip, and a transfer voltage $V_T$.

The transfer current $I_T$ can be expressed as $$I_T \propto (V_T - V_D)/Z \qquad \text{Equation 1}$$

where Z represents the impedance from the transfer roller 6 to the ground of the photoconductor 2.

Figure 5:
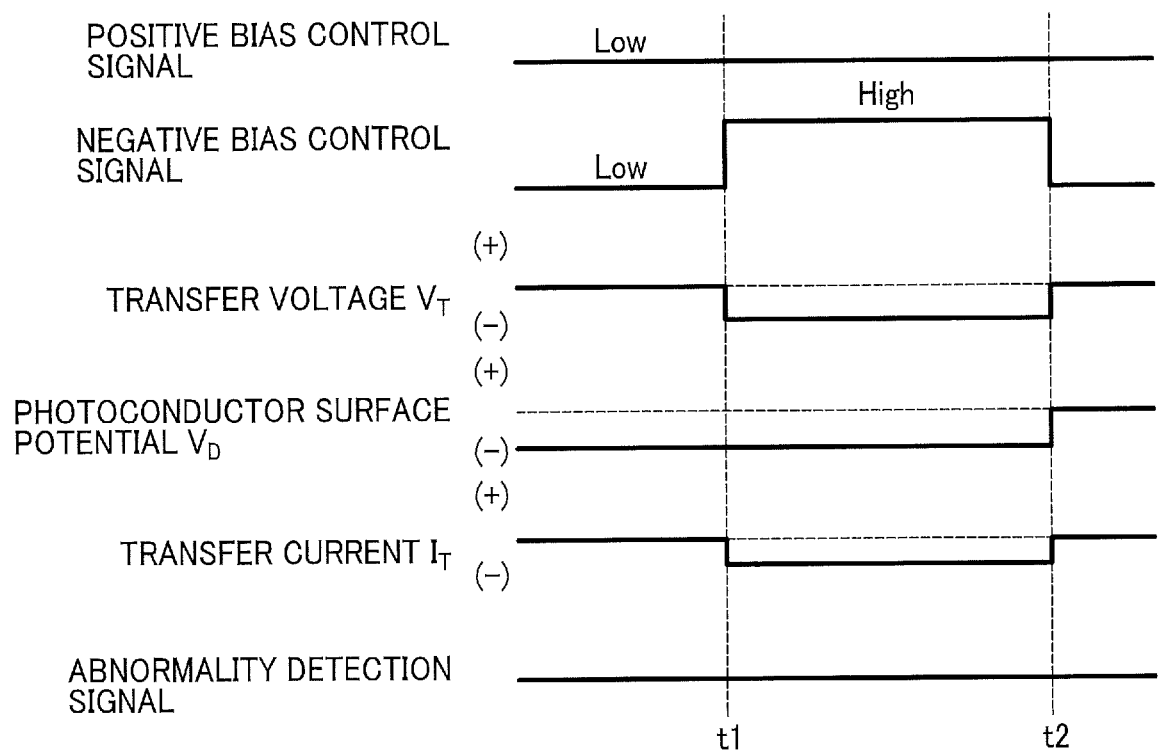
FIG. 5 is a first timing chart of a positive bias control signal, a negative bias control signal, the transfer voltage, the photoconductor surface potential, and the transfer current in the image forming apparatus.

FIG. 5 is a first timing chart of the positive bias control signal, the negative bias control signal, the transfer voltage $V_T$, the photoconductor surface potential $V_D$, and the transfer current $I_T$. FIG. 5 illustrates changes in the transfer voltage $V_T$, the photoconductor surface potential $V_D$, and the transfer current $I_T$ in response to the output of the negative bias control signal in a state where the positive bias control signal is not output.

In a state in which the positive bias control signal is kept at a low level (Low), the positive bias control signal is not output. While the positive bias control signal is not output, the photoconductor surface potential $V_D$ has a negative polarity. At a timing when the negative bias control signal changes from the low level (Low) to the high level (High), the negative bias control signal is output.

At a time t1, the negative bias control signal is output, that is, the negative bias control signal changes from the low level to the high level. Accordingly, at the time t1, the transfer voltage $V_T$ changes to a negative voltage. When the transfer voltage $V_T$ changes to the negative voltage, the photoconductor surface potential $V_D$ remains negative, and the transfer current $I_{T(-)}$ flows accompanying the change into the negative voltage of the transfer voltage $V_T$.

At a time t2, the negative bias control signal stops, that is, the negative bias control signal changes from the high level to the low level. When the negative bias control signal stops, the transfer voltage $V_T$ changes to 0 V. Accordingly, the transfer current $I_T$ changes to 0 A.

Figure 6:
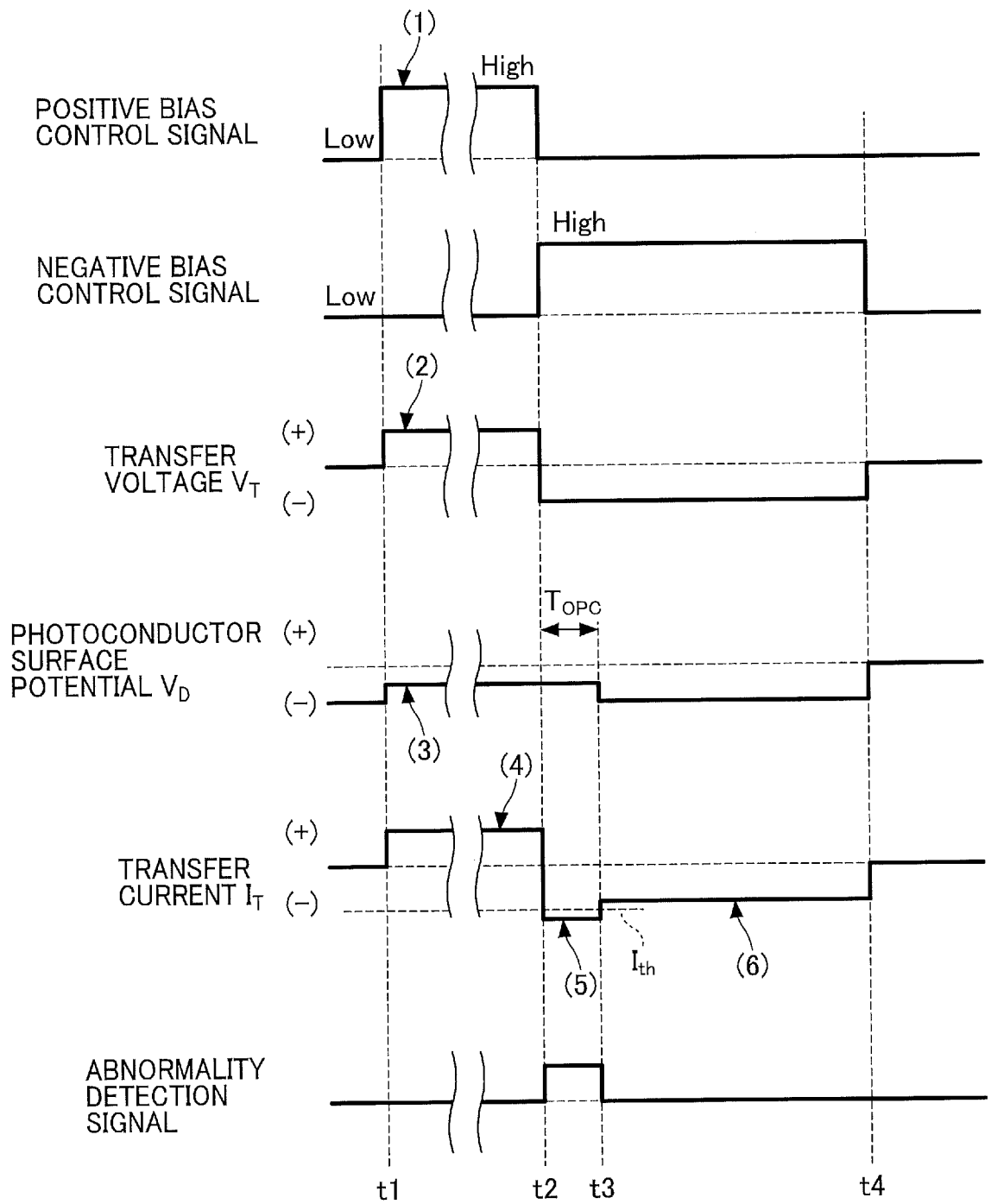
FIG. 6 is a second timing chart of the positive bias control signal, the negative bias control signal, the transfer voltage, the photoconductor surface potential, and the transfer current.

FIG. 6 is a second timing chart of the positive bias control signal, the negative bias control signal, the transfer voltage $V_T$, the photoconductor surface potential $V_D$, and the transfer current $I_T$.

In FIG. 6, the positive bias control signal has been output prior the period from the time t2 to a time t4 during which the negative bias control signal is output. Specifically, at the time t1, the positive bias control signal changes from low level to high level, and output of the positive bias control signal is continued as illustrated in (1) in FIG. 6 during the period from the time t1 to the time t2.

At this time, as illustrated in (2) in FIG. 6, the level of the transfer voltage $V_T$ rises, and as illustrated in (3) in FIG. 6, the absolute value of the negative photoconductor surface potential $V_D$ becomes smaller than the absolute value of the negative photoconductor surface potential $V_D$ illustrated in FIG. 5. Therefore, the value expressed as "$V_T-V_D$" in the above Equation 1 becomes large.

As a result, as illustrated in (4) in FIG. 6, the value of the transfer current $I_{T(+)}$ in the period from the time t1 to the time t2 increases. Further, as illustrated in (5) in FIG. 6, the absolute value of the transfer current $I_{T(-)}$ in the period from the time t2 to a time t3 increases. Therefore, there is a risk that a current equal to or larger than a threshold $I_{th}$ for overcurrent detection, which is compared with the transfer current $I_{T(-)}$, may flow even though a load short circuit or the like has not occurred.

Figure 7:
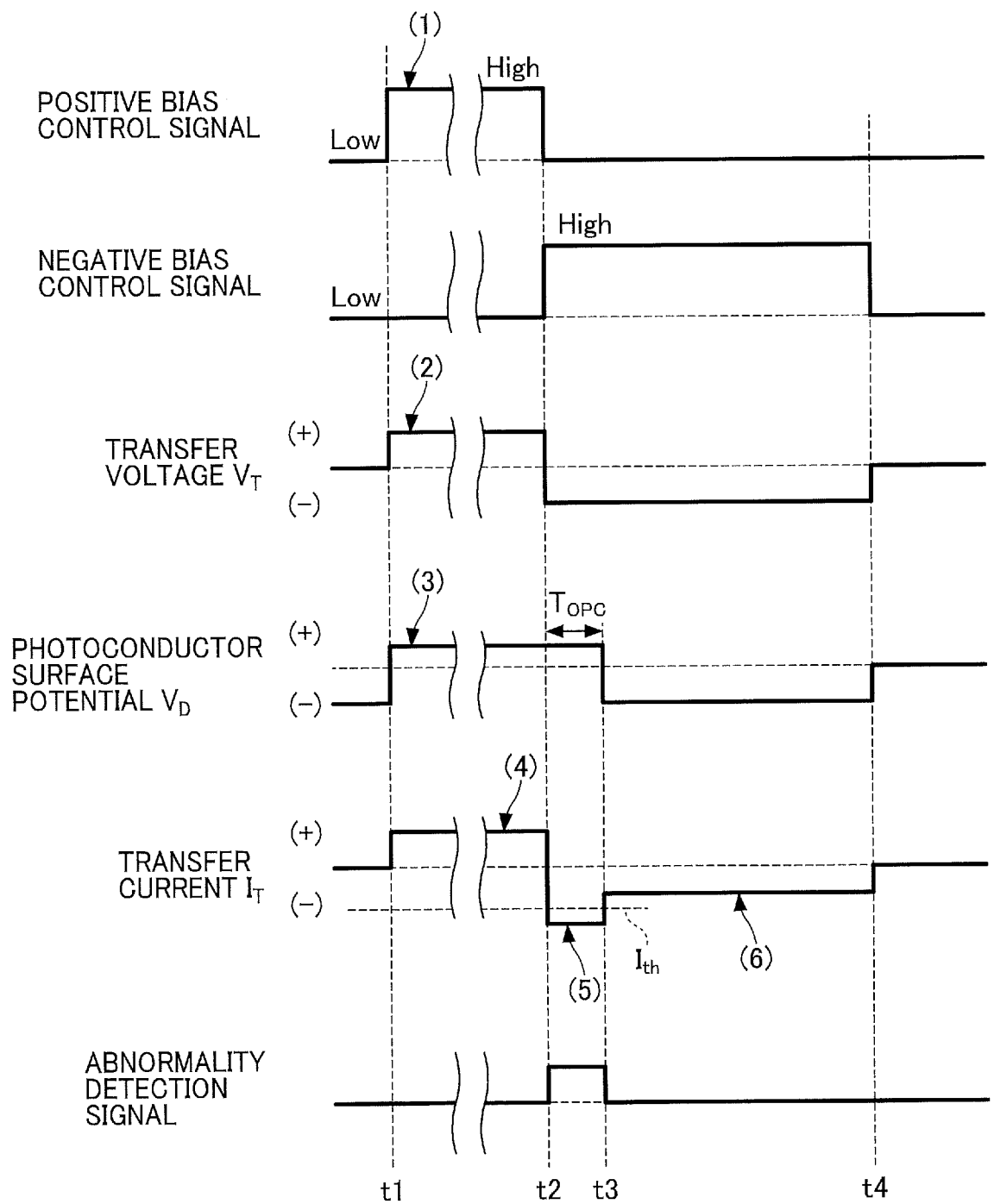
FIG. 7 is a third timing chart of the positive bias control signal, the negative bias control signal, the transfer voltage, the photoconductor surface potential, and the transfer current.

FIG. 7 is a third timing chart of the positive bias control signal, the negative bias control signal, the transfer voltage $V_T$, the photoconductor surface potential $V_D$, and the transfer current $I_T$. Difference from FIG. 6 as follows. As the polarity of the photoconductor surface potential $V_D$ becomes positive in (3) in FIG. 7, the value expressed as "$V_T-V_D$" in the above Equation 1 becomes large. Accordingly, the absolute value of the transfer current $I_{T(-)}$ from the time t2 to the time t3 in (5) in FIG. 7 is further increased. As a result, there is a risk that a current equal to or greater than the threshold $I_{th}$ for overcurrent detection, which is compared with the transfer current $I_{T(-)}$, may flow.

When the transfer current $I_{T(-)}$ becomes equal to or greater than the threshold $I_{th}$ as illustrated in FIGS. 6 and 7, the abnormality detection unit 11c transmits the abnormality detection signal to the controller 12. Accordingly, the controller 12 executes the short-circuit detection control. That is, the short-circuit detection control is executed even though the load short-circuit has not occurred. This phenomenon is an erroneous detection of short-circuit.

A conceivable approach to prevent the erroneous detection of short-circuit is changing the level of the threshold $I_{th}$. However, for example, the output current increases when the image bearer is temporarily charged to the polarity opposite to the polarity of the output from the power supply. Considering that, erroneous detection may frequently occur when the threshold for determining an abnormality is too low. By contrast, when the threshold is too high, there is a risk that an abnormality in the load is not detected. Thus, in the method of changing the threshold, there is a risk that the erroneous detection by the abnormality detection unit 11c becomes frequent, or the abnormality detection unit 11c may fail to detect an abnormality. Therefore, this method does not solve the above-described inconvenience, and conventionally, the control is complicated. However, complicated control requires enhancement in capabilities of the components. Further, since the board on which the components are mounted tends to increase in size, the manufacturing cost of the controller 12 and the like will increase.

After the output of the negative bias control signal is started at the time t2 in FIGS. 6 and 7, the photoconductor surface potential ($V_D'$) after passing through the transfer roller nip decreases to a level similar to the photoconductor surface potential $V_D$ in FIG. 5. The photoconductor 2 that has started rotating at the time t2 completes one rotation at the time t3. As the surface potential $V_D$ of the entire surface of the photoconductor 2 becomes $V_D=V_D'$ the time t3, the transfer current $I_T$ follows the surface potential $V_D$ of the photoconductor 2. That is, the transfer current $I_{T(-)}$ has the small absolute value as indicated in (6) in FIGS. 6 and 7.

As a result, the abnormality detection unit 11c stops outputting the abnormality detection signal. Therefore, the time during which the transfer current $I_T$ having a large value keeps flowing due to the change in the photoconductor surface potential $V_D$ is equivalent to a period $T_{OPC}$ [s] from the time t2 at which the output of the negative bias control signal is started to the time t3 at which the photoconductor 2 completes one rotation. The period $T_{OPC}$ [s] is the time required for the photoconductor 2 to make one rotation and can be expressed by Equation 2 below.

$$T_{OPC} = L/v \qquad \text{Equation 2}$$

where L represents a peripheral length [mm] of the photoconductor 2, and v is a process speed [mm/s].

The risk of the erroneous detection of short-circuit is present only during the period $T_{OPC}$. After the period $T_{OPC}$, for example, the current equivalent to the transfer current $I_T$ illustrated in FIG. 5 flows when the load is in a normal state, that is, not short-circuited. By contrast, in a state where the load is abnormal, that is, short-circuited, the overcurrent continues to flow even after the period $T_{OPC}$, and the short-circuit detection control is performed.

Therefore, the image forming apparatus 100 according to the present embodiment is configured to mask the abnormality detection from when the output of the transfer current $I_{T(-)}$ is started until, for example, the period $T_{OPC}$ elapses. Such masking can prevent an erroneous detection of short-circuit in the controller 12 due to a change in the photoconductor surface potential $V_D$, without performing complicated control. As a result, the manufacturing cost of the controller 12 can be prevented from increasing.

Figure 8:
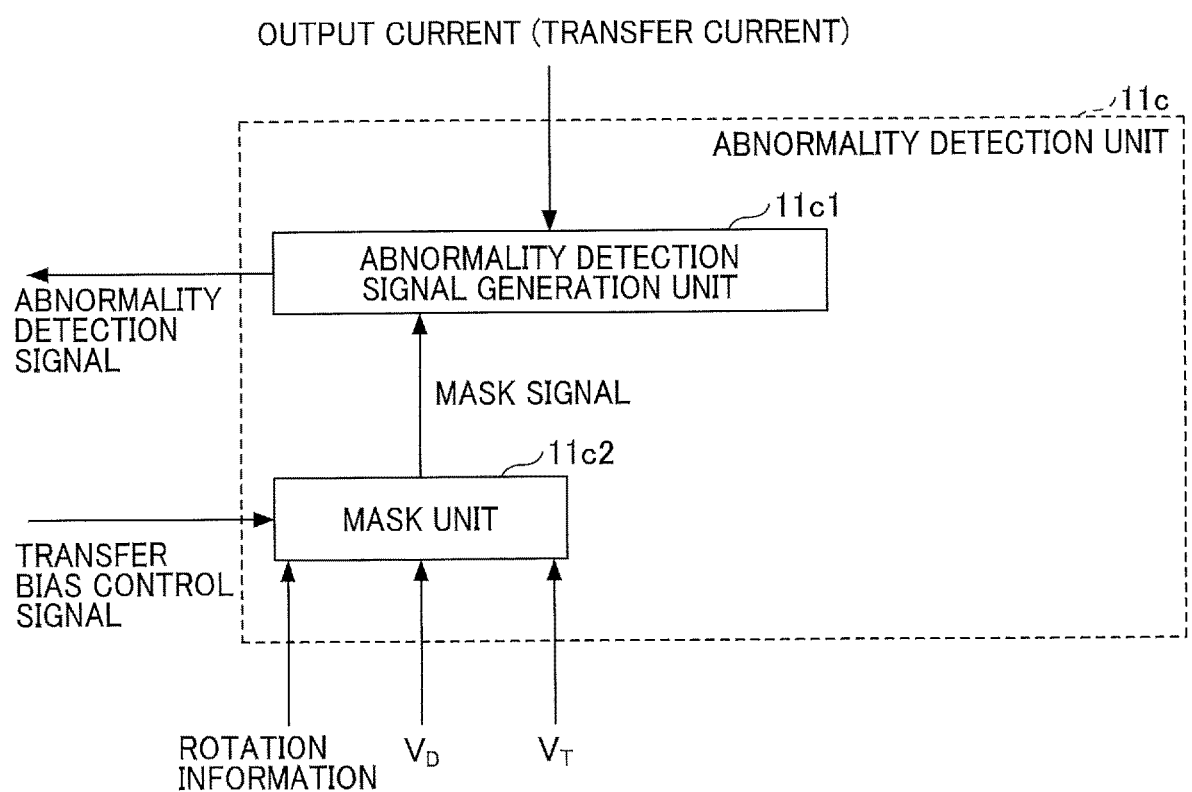
FIG. 8 is a block diagram illustrating a functional configuration of an abnormality detection unit of the image forming apparatus.
Figure 9:
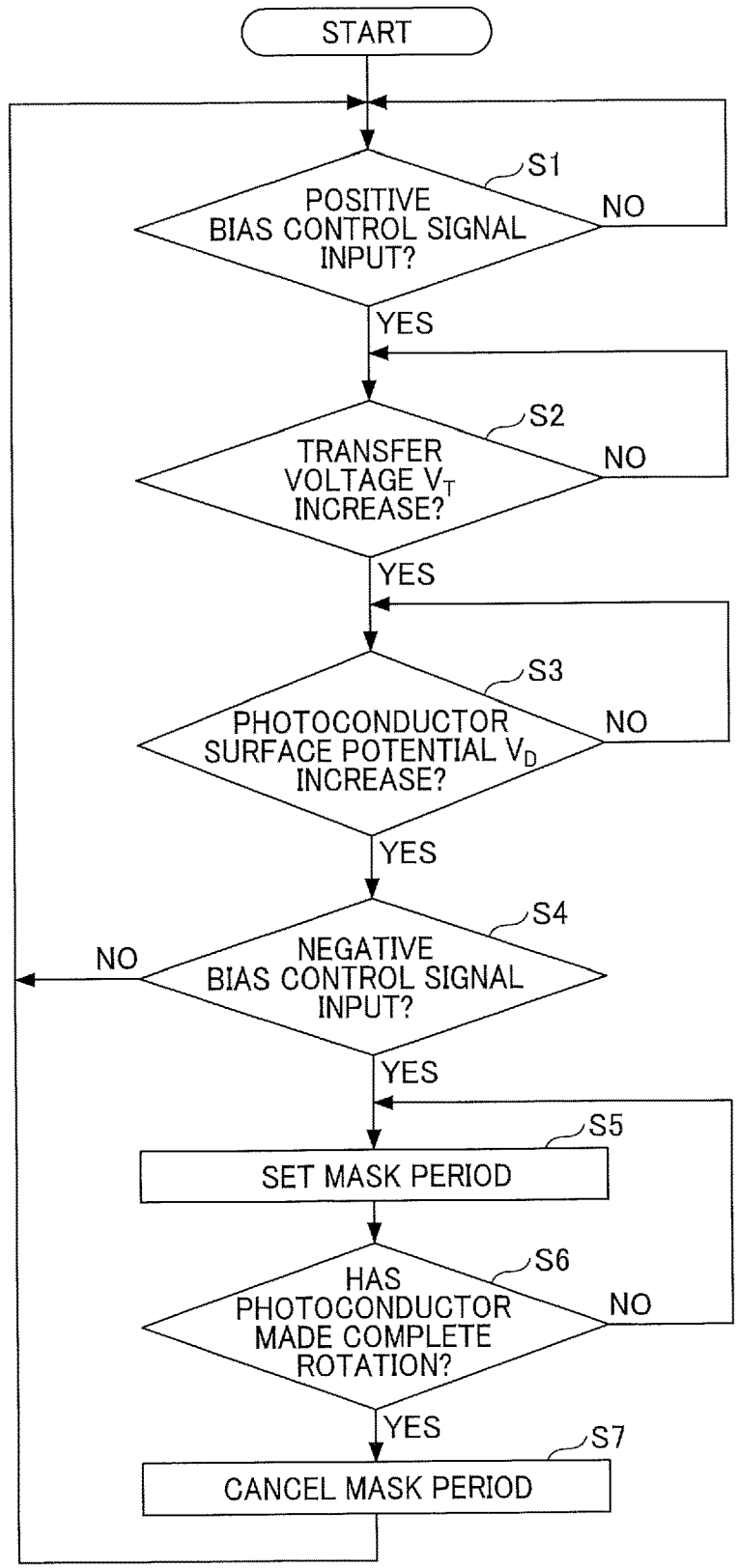
FIG. 9 is a first flowchart illustrating mask processing for abnormality detection according to an embodiment.
Figure 10:
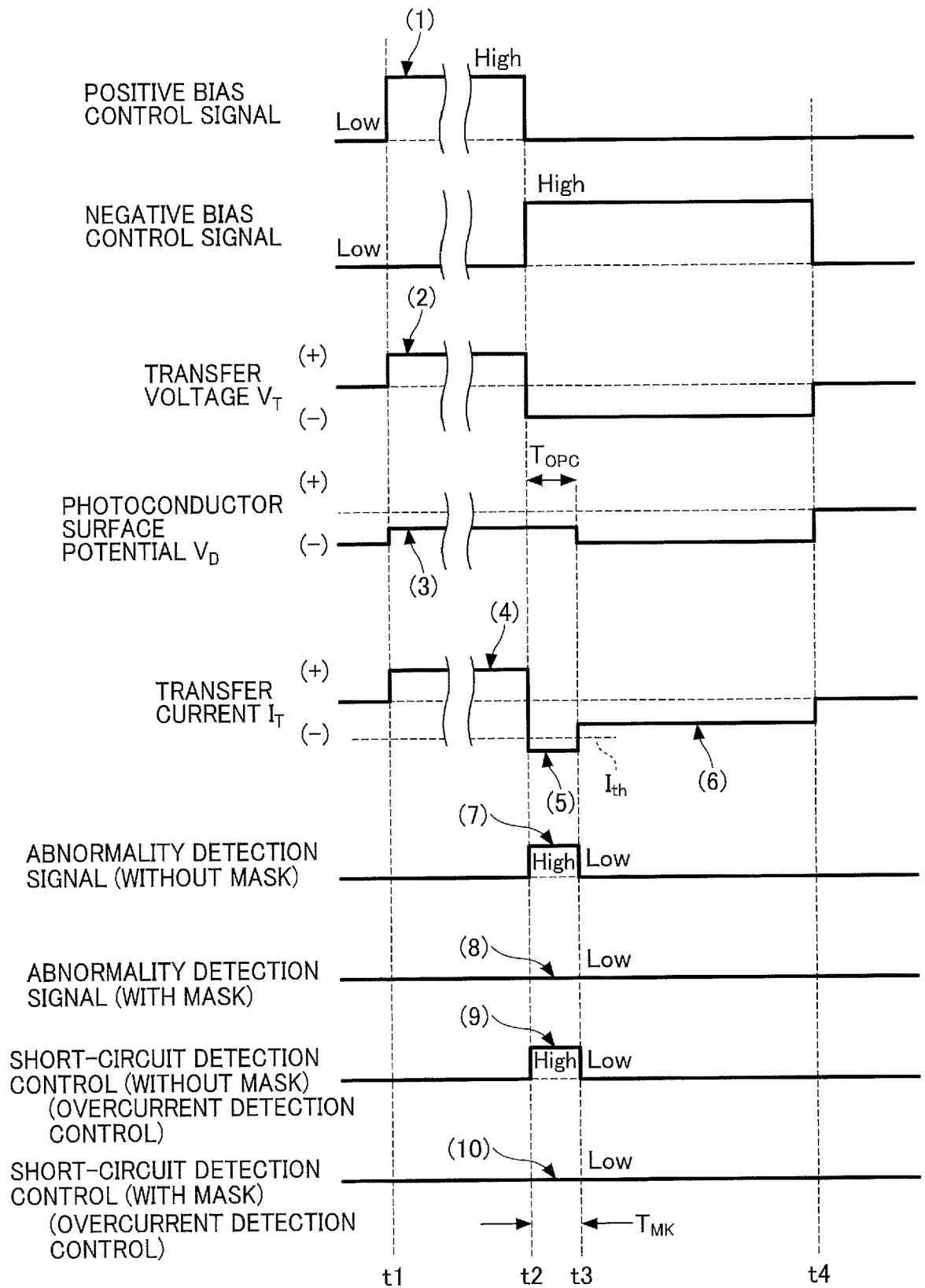
FIG. 10 is a first timing chart illustrating the mask processing of the abnormality detection.

Next, a description is given of the operation relating to the masking of the abnormality detection with reference to FIGS. 8 to 10. FIG. 8 is a block diagram illustrating a functional configuration of the abnormality detection unit. The abnormality detection unit 11c includes an abnormality detection signal generation unit 11c1 that generates an abnormality detection signal in response to a detection of an overcurrent, and a mask unit 11c2.

The mask unit 11c2 receives some or all of two types of transfer control signals (positive bias control signal and negative bias control signal), rotation information, the transfer voltage $V_T$, and the photoconductor surface potential $V_D$. The rotation information is, for example, information transmitted from a rotation information detection unit that detects rotation information (rotation speed, rotation position, rotation angle, etc.) of the photoconductor 2. The transfer voltage $V_T$ is, for example, information transmitted from an output transfer voltage detection unit 11c6 (illustrated in FIG. 13), provided in the power supply 11, that detects the transfer voltage. The output transfer voltage detection unit 11c6 inputs an output transfer voltage feedback signal to the controller 12. The photoconductor surface potential $V_D$ is, for example, information transmitted from the potential sensor 200 (a photoconductor potential detection unit) illustrated in FIG. 3, disposed near the photoconductor 2, that detects the surface potential of the photoconductor 2. The mask unit 11c2 can be provided in the abnormality detection unit 11c or in the controller 12.

FIG. 9 is a first flowchart illustrating the mask processing of the abnormality detection. FIG. 10 is a first timing chart illustrating the mask processing of the abnormality detection.

In S1, the mask unit 11c2 determines whether or not the positive bias control signal has been input. When the positive bias control signal has not been input (S1, No), the process of S1 is repeated until the positive bias control signal is input.

In response to an input of the positive bias control signal (S1, Yes), in S2, the mask unit 11c2 determines whether the transfer voltage $V_T$ has increased. When the transfer voltage $V_T$ has not increased (S2, No), the process of S2 is repeated until the transfer voltage $V_T$ increases.

In response to an increase of the transfer voltage (S2, Yes), in S3, the mask unit 11c2 determines whether the photoconductor surface potential $V_D$ has increased. When the photoconductor surface potential $V_D$ has not increased (step S3, No), the process of step S3 is repeated until the photoconductor surface potential $V_D$ increases.

In response to an increase of the photoconductor surface potential $V_D$ (Yes in S3), in S4, the mask unit 11c2 determines whether or not the negative bias control signal has been input. When the negative bias control signal has not been input (S1, No), the process of S1 to S4 is repeated until the positive bias control signal is input.

In response to an input of the negative bias control signal (S4, Yes), in S5, the mask unit 11c2 generates a mask signal for providing the mask period of the abnormality detection, and outputs the generated mask signal to, for example, the abnormality detection signal generation unit 11c1. Accordingly, the abnormality detection signal generation unit 11c1 sets the mask period for the abnormality detection.

In S6, the mask unit 11c2 calculates the period $T_{OPC}$ [s] using the above Equation 2 based on the rotation information (for example, including the process speed [mm/s]), and determines whether or not the period $T_{OPC}$ [s] has elapsed from the output of the mask signal, that is, whether or not the photoconductor 2 has made one complete rotation.

When the photoconductor 2 has not yet completed one rotation (S6, No), the mask unit 11c2 repeats the processes of S5 and S6 until the photoconductor 2 completes one rotation.

When the photoconductor 2 has completed one rotation (S6, Yes), in S7, the mask unit 11c2 cancels the setting of the mask period of the abnormality detection.

With the detection of the photoconductor surface potential $V_D$ and the transfer voltage $V_T$, the mask unit 11c2 can mask the abnormality detection only when the transfer current $I_{T(-)}$ becomes excessive.

FIG. 10 is a timing charge that illustrates the level of the abnormality detection signal when the mask period is not set (without mask), the level of the anomaly detection signal when the mask period is set (with mask), the elements in the short-circuit detection control when the mask period is not set, and the elements in the short-circuit detection control when the mask period is set.

When the mask period is not provided, as indicated in (7) in FIG. 10, the level of the abnormality detection signal becomes high during the period $T_{OPC}$. Accordingly, the short-circuit detection control is executed as illustrated in (9) in FIG. 10.

On the other hand, when the mask period (a period $T_{MK}$ in FIG. 10) is provided, the level of the abnormality detection signal remains low during the period $T_{OPC}$ as indicated in (8) in FIG. 10. Accordingly, the short-circuit detection control is not executed as indicated in (10) in FIG. 10.

In the present embodiment, the mask period is set to the entire period from when the negative bias control signal is output to when the photoconductor 2 completes one rotation. Alternatively, the mask period can be a part of the period until the photoconductor 2 completes one rotation.

Specifically, it is assumed that, in consideration of the influence of noise or the like, the controller 12 sets a time T1 during which the abnormality detection signal is valid to, for example, 200 msec or longer, and sets the period $T_{OPC}$ to 300 msec that is longer than the time T1. In this case, when the mask period is set to, for example, 150 msec that is shorter than the period $T_{OPC}$, the controller 12 regards the abnormality detection signal as invalid, and thus does not execute the short-circuit detection control.

Figure 11:
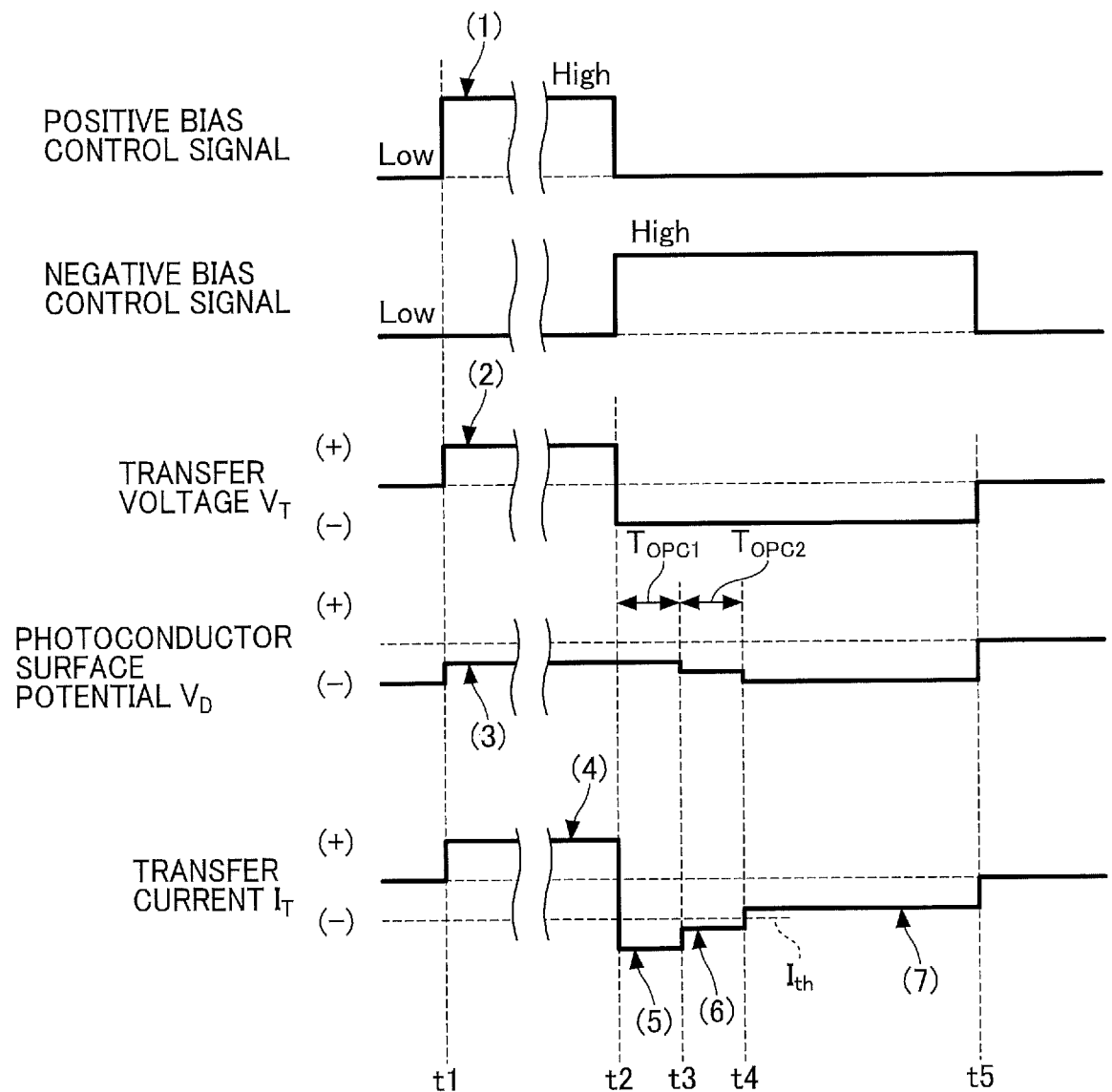
FIG. 11 is a timing chart illustrating an operation when the photoconductor is rotated more than one rotation.

Further, the mask period can be set to be equal to or longer than the time required for the photoconductor 2 to make a complete rotation. FIG. 11 is a timing chart illustrating the operation when the photoconductor 2 is rotated complete rotation or more. In FIG. 11, the negative bias control signal is output from the time t2 to a time t5. A period $T_{OPC1}$ in FIG. 11 corresponds to a first rotation of the photoconductor 2. That is, the period $T_{OPC1}$ is equivalent to the period from when the negative bias control signal changes from the low level to the high level and the photoconductor 2 starts rotating to when the photoconductor 2 completes one rotation. A period $T_{OPC2}$ in FIG. 11 corresponds to a second rotation of the photoconductor 2. That is, the period $T_{OPC2}$ is equivalent to the period from the end of the first rotation to the end of the second rotation.

For example, the transfer voltage $V_T$ can increase more than expected in a hot and humid environment. In such a situation, it is possible that the charge of the photoconductor 2 is not fully removed by rotating the photoconductor 2 once, and the transfer current $I_T$ maintains a value equal to or higher than the threshold $I_{th}$ as indicated in (5) and (6) in FIG. 11. Even in this case, for example, by increasing the number of rotations of the photoconductor 2 according to the value of the transfer voltage $V_T$, the electric charges on the photoconductor 2 can be reliably removed. In the example illustrated in FIG. 11, at the time t4 when the photoconductor 2 has completed two rotations, as illustrated in (7) in FIG. 11, the transfer current $I_T$ can be reduced to be lower than the threshold $I_{th}$.

The rotation time of the photoconductor 2 is not limited to an integral multiple of the time for the photoconductor 2 to make one rotation, and can be, for example, 1.1 times or 1.2 times. Also in this case, as indicated in (5) and (6) in FIG. 11, the transfer current $I_T$ decreases gradually with elapse of time rather than stepwise. Therefore, for example, the transfer current $I_T$ may become lower than the threshold $I_{th}$ at the time when the photoconductor 2 has rotated 1.5 times.

The image forming apparatus 100 according to the present embodiment can be configured to change the mask period according to the rotation speed of the photoconductor 2. The rotation speed of the photoconductor 2 is also called a linear speed or a process speed, and tends to become slower as the recording medium (paper or the like) on which printing is made becomes thicker. According to Equation 2 above, the slower the process speed "v", the longer the period $T_{OPC}$.

Changing the mask period according to the rotation speed of the photoconductor 2, that is, the process speed, is advantageous in preventing the erroneous detection of short-circuit without affecting print quality. That is, when the recording medium is thick, the process speed v is slowed down and the period $T_{OPC}$ is increased, so that erroneous detection of short-circuit can be prevented while maintaining constant toner fixation. Further, when the recording medium is thin, the process speed v is increased and the period $T_{OPC}$ is shortened, so that erroneous detection of short-circuit can be prevented while increasing the printing speed.

Figure 12:
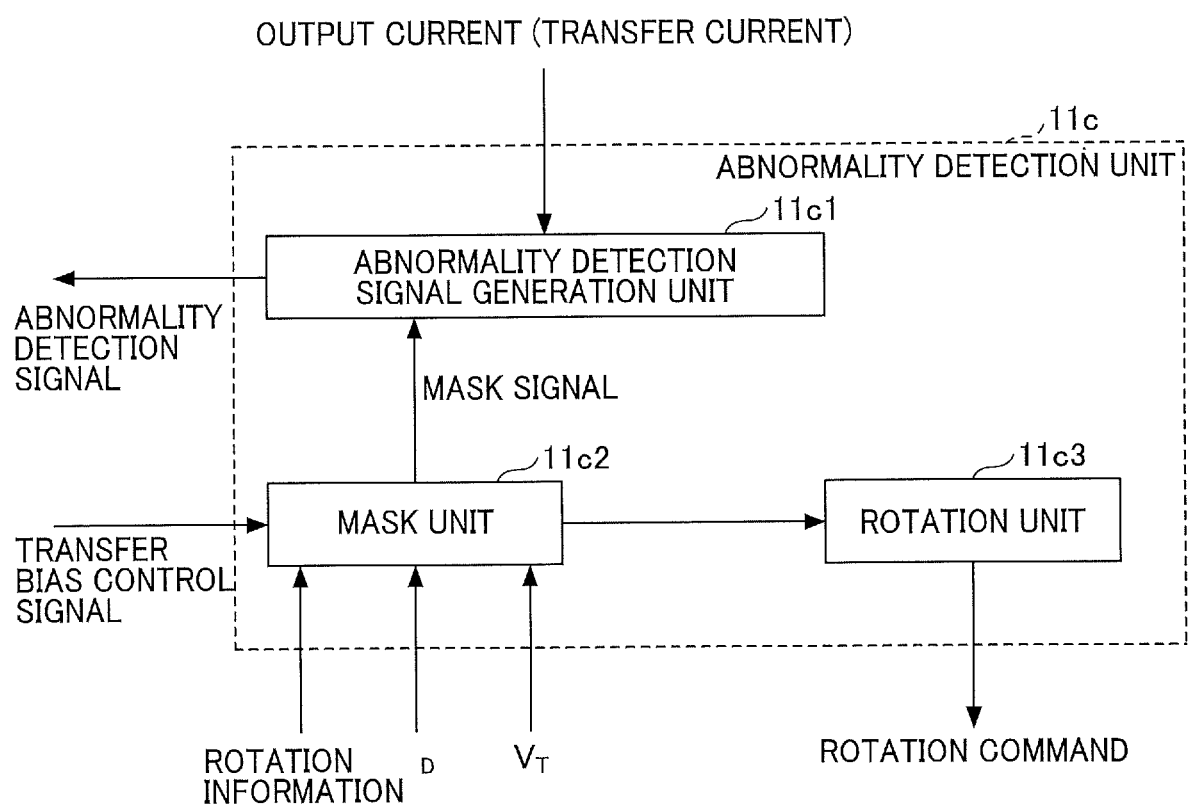
FIG. 12 is a block diagram illustrating a functional configuration of an abnormality detection unit according to a modification.

FIG. 12 is a diagram illustrating an example of a configuration of an abnormality detection unit according to a modification. The abnormality detection unit 11c illustrated in FIG. 12 includes a rotation unit 11c3 in addition to the abnormality detection signal generation unit 11c 1 and the mask unit 11c2. The rotation unit 11c3 outputs a rotation command to continue the rotation of the photoconductor 2 as an image bearer when an overcurrent occurs due to change of the voltage applied to the photoconductor 2 from the first voltage to the second voltage, that is, while the mask unit 11c2 keeps outputting the mask signal. The rotation command is input to a driver that rotates the photoconductor 2. With this configuration, the photoconductor 2 continues to rotate, and, while the photoconductor 2 rotates, the mask signal is output to set the mask period.

The rotation unit 11c3 stops the output of the rotation command when the overcurrent does not occur, that is, while the mask signal is not output from the mask unit 11c2. As a result, the photoconductor 2 stops rotating, and the setting of the mask period is canceled while the photoconductor 2 does not rotate.

In this way, by interlocking the rotation of the photoconductor 2 with the overcurrent state, the erroneous detection of short-circuit in the controller 12 can be prevented while resetting the overcurrent state at an early stage.

As described above, the image forming apparatus 100 according to the present embodiment includes the photoconductor 2 that is the image bearer, the first power supply that generates the first voltage applied to the image bearer, the second power supply that generates the second voltage having a polarity opposite to that of the first voltage and applied to the image bearer, the abnormality detection unit that detects an abnormality by detection of an overcurrent, and a controller that controls the first and second power supplies. In this configuration, the image forming apparatus 100 sets a mask period for masking the abnormality detection when an overcurrent state occurs due to a change of the voltage applied to the image bearer from the first voltage to the second voltage.

With this configuration, the mask period of the abnormality detection is set even when the surface potential of the image bearer has a polarity opposite to that of the potential by the first voltage and the output current of the power supply 11 increases. Accordingly, with a simple circuit configuration and a simple abnormality detection program, erroneous detection of abnormality such as short-circuit can be prevented.

Additionally, the present embodiment provides a method for preventing erroneous detection of abnormality in an image forming apparatus that includes an image bearer, a first power supply that generates a first voltage applied to the image bearer, a second power supply that generates a second voltage applied to the image bearer and having a polarity opposite to the polarity of the first voltage, and an abnormality detection unit that detects an abnormality by detection of an overcurrent. The method includes setting a mask period for masking the detection of the abnormality in response to an output of a second voltage control signal (e.g., the negative bias control signal) to the second power supply after an output of a first voltage control signal (e.g., the positive bias control signal) to the first power supply.

Additionally, the present embodiment provides a program for an image forming apparatus that includes an image bearer, a first power supply that applies a first voltage to the image bearer, a second power supply that applies, to the image bearer, a second voltage having a polarity opposite to the polarity of the first voltage, and an abnormality detection unit that detects an abnormality by detection of an overcurrent. The program causes the image forming apparatus to set a mask period for masking the detection of the abnormality in response to an output of a second voltage control signal to the second power supply after an output of a first voltage control signal to the first power supply.

Figure 13:
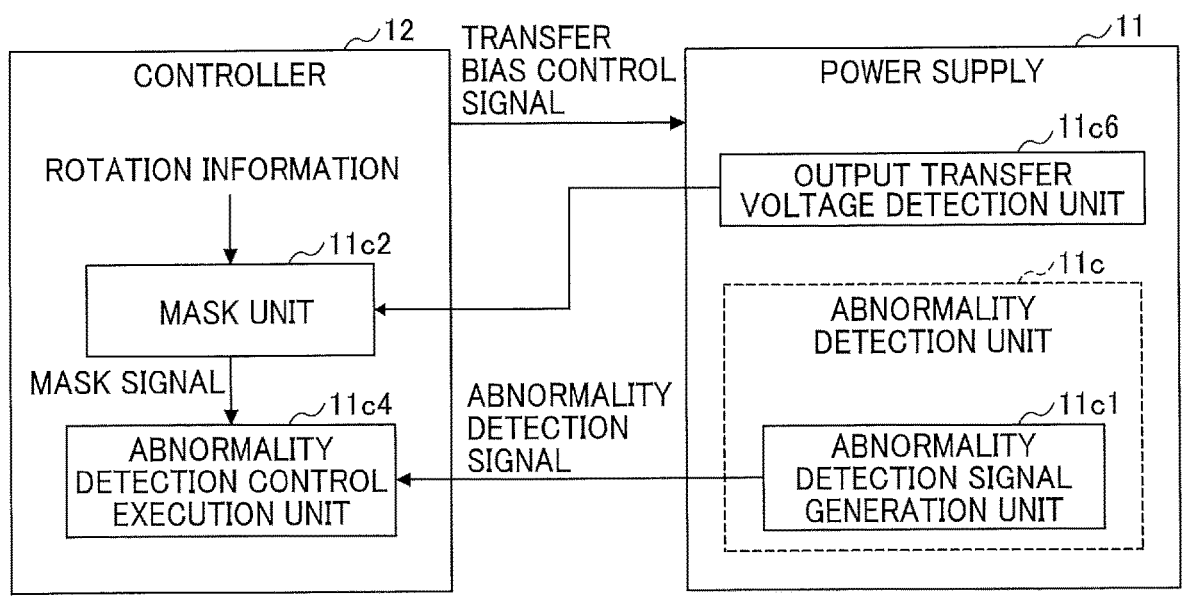
FIG. 13 is a block diagram illustrating configurations of a controller and an abnormality detection unit according to another modification.

FIG. 13 is a block diagram illustrating configurations of a controller and an abnormality detection unit according to another modification. As illustrated in FIG. 13, the controller 12 includes a mask unit 11c2 and an abnormality detection execution unit 11c4.

The rotation information is input to the mask unit 11c2. The rotation information is, for example, information transmitted from a rotation information detection unit that detects rotation information (rotation position, rotation speed, rotation angle, etc.) of the photoconductor 2. The abnormality detection execution unit 11c4 performs mask control even when the level of the abnormality detection signal from the abnormality detection signal generation unit 11c1 changes from the low level to the high level. The mask control is for inhibiting the abnormality detection with the mask signal from the mask unit 11c2, even when the level of the abnormality detection signal changes from the low level to the high level.

Note that the controller 12 illustrated in FIG. 13 does not detect the transfer voltage $V_T$ and the photoconductor surface potential $V_D$ described above and does not reflect the transfer voltage $V_T$ and the photoconductor surface potential $V_D$ in the mask control. In a sequence that the negative bias control signal is output immediately after the positive bias control signal is output, the controller 12 executes the mask control assuming that the transfer current $I_{T(-)}$ becomes large.

Figure 14:
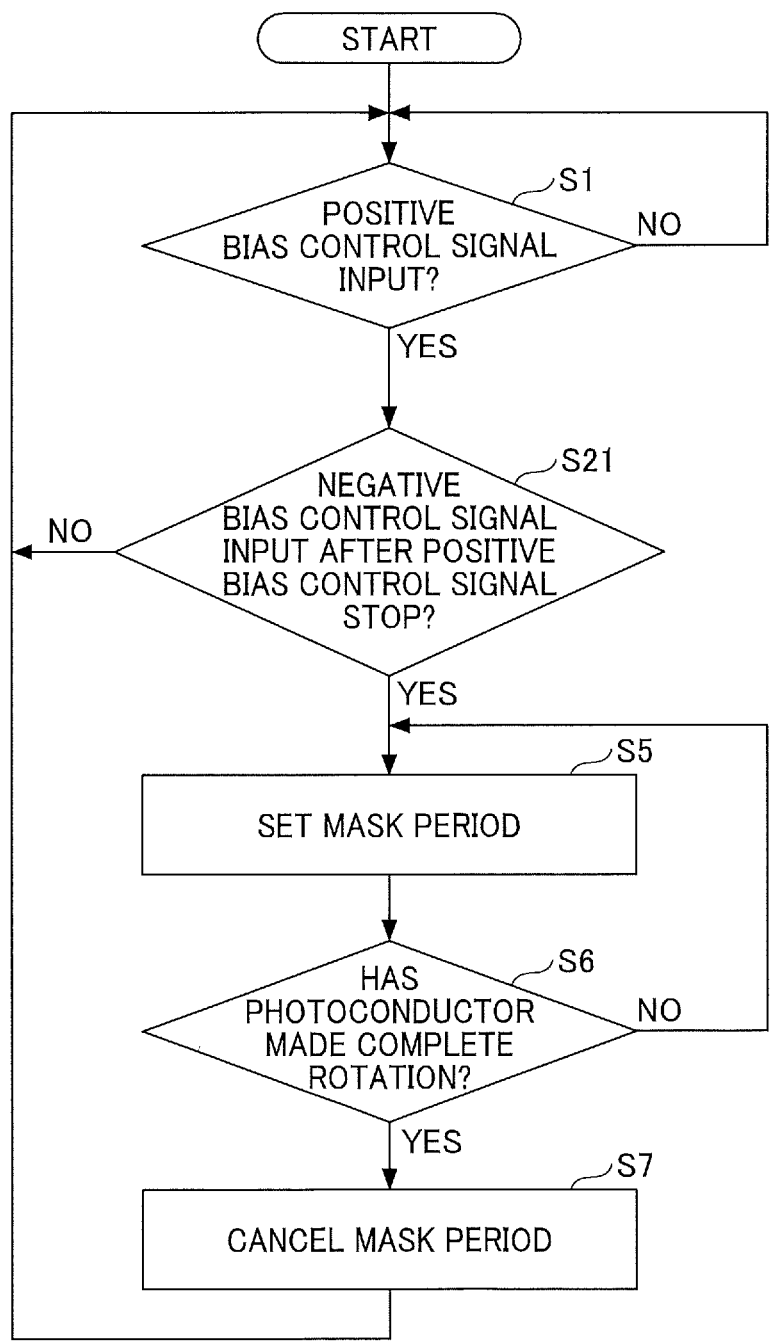
FIG. 14 is a second flowchart illustrating mask processing of the abnormality detection according to an embodiment.

This operation is described with reference to FIGS. 14 and 15. FIG. 14 is a second flowchart illustrating the mask processing of the abnormality detection. The processing in S1 and the processing in S5 to S7 are the same as those illustrated in FIG. 9. In S1, the mask unit 11c2 determines whether or not the positive bias control signal has been input. When the positive bias control signal has not been input (S1, No), the process of S1 is repeated until the positive bias control signal is input. In response to an input of the positive bias control signal (S1, Yes), the mask unit 11c2 performs the process in S21. In S21, the controller 12 determines whether or not the negative bias control signal is input immediately after the positive bias control signal is output (after the positive bias control signal is stopped). When the negative bias control signal has not been input (S21, No), the process of S21 is repeated until the negative bias control signal is input. When the negative bias control signal is input (S21, Yes), the controller 12 performs the processing from S5 to S7. That is, the controller 12 executes the mask control on the assumption that the transfer current $I_{T(-)}$ becomes large.

Figure 15:
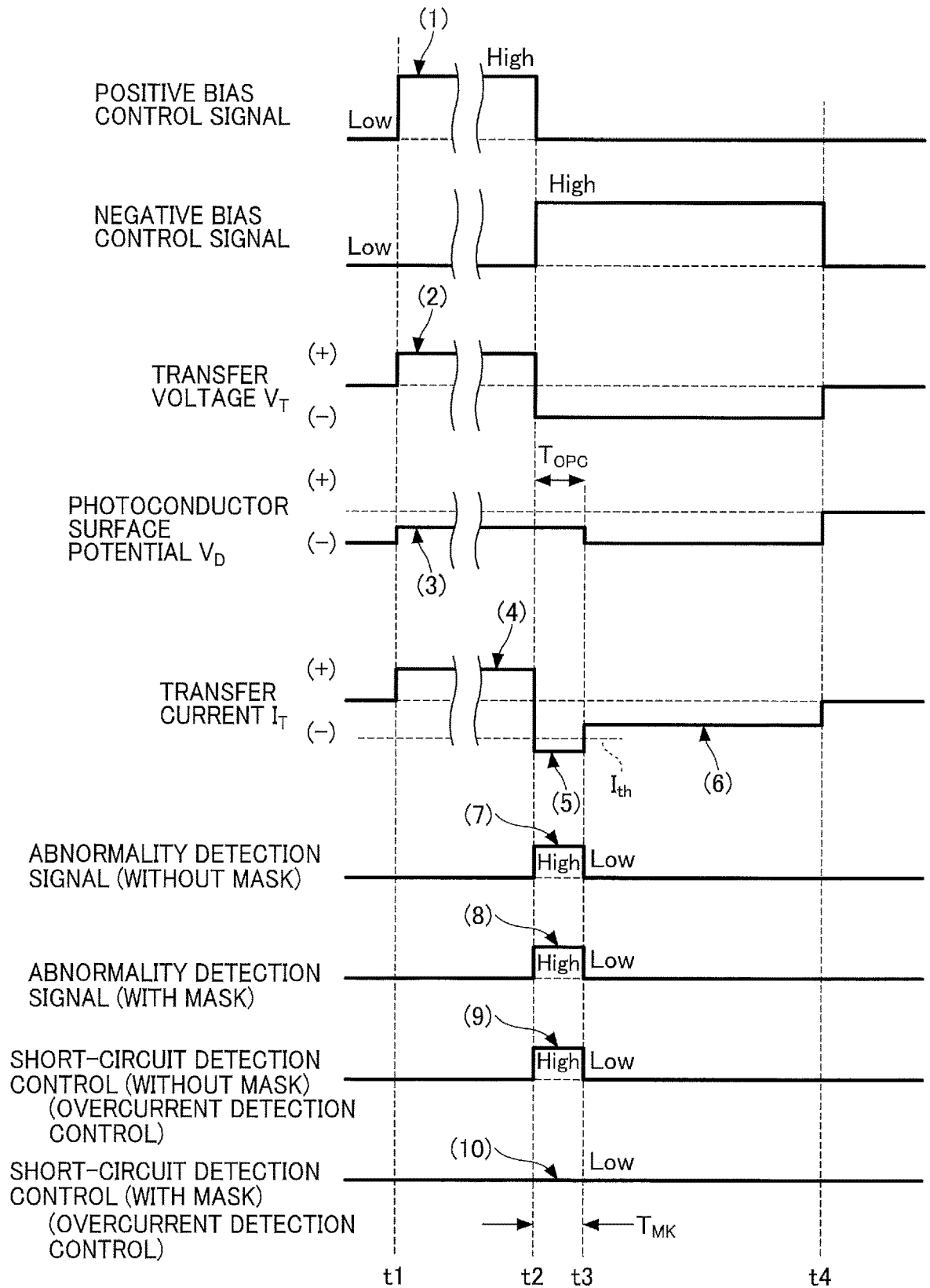
FIG. 15 is a second timing chart illustrating the mask processing of the abnormality detection.

FIG. 15 is a second timing chart illustrating the mask processing of the abnormality detection. The difference from FIG. 10 is that the level of the abnormality detection signal changes from the low level to the high level during the period $T_{OPC}$ as indicated in (8) in the figure when the mask period is set. That is, since the mask unit 11c2 is provided in the controller 12, the abnormality detection signal becomes high level even when the mask period is present, but the short-circuit detection control is not executed (that is, remains at low level).

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An image forming apparatus comprising:
    an image bearer;
    a first power supply configured to generate a first voltage to be applied to the image bearer according to a first voltage control signal;
    a second power supply configured to generate a second voltage to be applied to the image bearer according to a second voltage control signal, the second voltage having a polarity opposite to a polarity of the first voltage; and
    circuitry configured to
        generate the first voltage control signal and the second voltage control signal to change the first voltage applied to the image bearer to the second voltage;
        detect an overcurrent fault in the image forming apparatus;
        set a mask period during which the detection of the overcurrent fault in the image forming apparatus is masked,
    wherein the circuitry is configured to
        determine whether a first surface potential of the image bearer to which the first voltage is applied is greater than a second surface potential of the image bearer obtained prior to the application of the first voltage to the image bearer,
        output, upon determining that the first surface potential is greater than the second surface potential, the second voltage control signal to the second power supply to change a voltage applied to the image bearer to the generated second voltage,
        set the mask period in response to the output second voltage control signal, and
        output a command to continue to rotate the image bearer to a driver for the image bearer, during the mask period.

2. The image forming apparatus according to claim 1, further comprising a transfer roller disposed between the first power supply and the second power supply, and the image bearer, the transfer roller configured to apply the first voltage and the second voltage to the image bearer.

3. The image forming apparatus according to claim 1, wherein a length of the mask period is not shorter than a length of time for the image bearer to make one rotation.

4. The image forming apparatus according to claim 1, wherein the circuitry is configured to change a length of the mask period in accordance with a rotation speed of the image bearer.

5. The image forming apparatus according to claim 1, wherein the circuitry is configured to:
   stop the rotation of the image bearer in response to an end of the mask period.

6. The image forming apparatus according to claim 1, wherein the circuitry is configured to:
   detect an output value of the second voltage; and
   according to the output value of the second voltage, change a rotation number of the image bearer from the input of the second voltage control signal after the input of the first voltage control signal.

7. A method for preventing erroneous abnormality detection in an image forming apparatus, the method comprising:
   receiving a first voltage control signal to generate a first voltage to be applied to an image bearer;
   receiving a second voltage control signal to generate a second voltage to be applied to the image bearer, the second voltage having a polarity opposite to a polarity of the first voltage;
   changing the first voltage applied to the image bearer to the second voltage;
   detecting an overcurrent fault in the image forming apparatus; and
   setting a mask period during which the detection of the overcurrent fault in the image forming apparatus is masked, the setting of the mask period including
      determining whether a first surface potential of the image bearer to which the first voltage is applied is greater than a second surface potential of the image bearer obtained prior to the application of the first voltage to the image bearer,
      outputting, upon determining that the first surface potential is greater than the second surface potential, the second voltage control signal to change a voltage applied to the image bearer to the generated second voltage,
      setting the mask period in response to the output second voltage control signal, and
      outputting a command to continue to rotate the image bearer to a driver for the image bearer, during the mask period.

8. A non-transitory recording medium storing a plurality of program codes which, when executed by one or more processors, causes the processors to perform a method for preventing erroneous abnormality detection in an image forming apparatus, the method comprising:
   receiving a first voltage control signal to generate a first voltage to be applied to an image bearer;
   receiving a second voltage control signal to generate a second voltage to be applied to the image bearer, the second voltage having a polarity opposite to a polarity of the first voltage;
   changing the first voltage applied to the image bearer to the second voltage;
   detecting an overcurrent fault in the image forming apparatus;
   setting a mask period during which the detection of the overcurrent fault in the image forming apparatus is masked, the setting of the mask period including
      determining whether a first surface potential of the image bearer to which the first voltage is applied is greater than a second surface potential of the image bearer obtained prior to the application of the first voltage to the image bearer,
      outputting, upon determining that the first surface potential is greater than the second surface potential, the second voltage control signal to change a voltage applied to the image bearer to the generated second voltage,
      setting the mask period in response to the output second voltage control signal, and
      outputting a command to continue to rotate the image bearer to a driver for the image bearer, during the mask period.

* * * * *